United States Patent [19]
Howard

[11] Patent Number: 6,065,561
[45] Date of Patent: May 23, 2000

[54] POWER STEERING SYSTEM WITH CONTROLLED CENTERING

[76] Inventor: Durrell U. Howard, 306 Krameria Dr., San Antonio, Tex. 78213

[21] Appl. No.: 09/197,692

[22] Filed: Nov. 23, 1998

[51] Int. Cl.[7] .................................................. B62D 5/065
[52] U.S. Cl. .......................................... 180/441; 91/375 A
[58] Field of Search .................................. 180/417, 421, 180/422, 423, 426, 441; 91/375 A, 380

[56] References Cited

U.S. PATENT DOCUMENTS

| | | | |
|---|---|---|---|
| 2,464,110 | 3/1949 | Wright . | |
| 3,022,772 | 2/1962 | Zeigler et al. . | |
| 3,373,631 | 3/1968 | Henry-Biabaud . | |
| 3,426,612 | 2/1969 | Henry-Biabaud . | |
| 3,896,702 | 7/1975 | Shah et al. | 91/375 A |
| 4,008,782 | 2/1977 | Chanal | 180/132 |
| 4,153,133 | 5/1979 | Anderson | 180/429 |
| 4,194,531 | 3/1980 | Bishop | 137/596 |
| 4,232,585 | 11/1980 | Shea et al. | 91/432 |
| 4,325,447 | 4/1982 | Dauvergne | 180/132 |
| 4,566,477 | 1/1986 | Barker et al. | 137/101 |
| 4,576,003 | 3/1986 | Rau et al. | 60/384 |
| 4,625,624 | 12/1986 | Adams | 91/375 A |
| 4,665,695 | 5/1987 | Rau et al. | 60/384 |
| 4,730,688 | 3/1988 | Hasegawa | 180/148 |
| 4,774,847 | 10/1988 | Breitweg | 74/388 |
| 4,856,607 | 8/1989 | Sueshige et al. | 180/142 |
| 4,940,104 | 7/1990 | Hasegawa | 180/132 |
| 5,107,752 | 4/1992 | Elser et al. | 91/375 A |
| 5,165,496 | 11/1992 | Pedersen et al. | 180/132 |
| 5,211,069 | 5/1993 | Wada et al. | 74/400 |
| 5,357,845 | 10/1994 | Sangret | 91/375 A |
| 5,529,137 | 6/1996 | Lang | 180/417 |
| 5,553,683 | 9/1996 | Wenzel et al. | 180/417 |
| 5,697,400 | 12/1997 | Pfeifer | 137/625.24 |
| 5,701,970 | 12/1997 | Arbjerg | 180/417 |
| 5,816,359 | 10/1998 | Gregorio et al. | 180/403 |
| 5,816,594 | 10/1998 | Howard | 280/90 |

*Primary Examiner*—Kevin Hurley
*Attorney, Agent, or Firm*—Pollock, Vande Sande & Amernick

[57] ABSTRACT

A vehicle power steering system comprising a power unit, a valve unit and a centering unit. A piston of the power unit reciprocates in a cylinder to provide power assisted steering and is engaged by a worm connected to the steering shaft for rotation in response to either the centering unit or the vehicle steering member. The valve unit is connected between the worm of the power unit and a steering shaft segment from the centering unit, and includes a rotary valve member rigidly fixed to the steering shaft segment and rotatably received in the bore of a sleeve member fixed to the worm. The sleeve member is connected to the rotary valve member through a torsion rod arranged to actuate a pair of spool valves formed by valving elements on the rotary valve member and the sleeve member. The spool valves are arranged to provide fluid flow to and from the power unit only while the steering shaft is being turned by either the steering member or the centering unit, so as to prevent uncontrolled return of the steering system toward its center position in response to road forces acting on the steerable wheels.

15 Claims, 10 Drawing Sheets

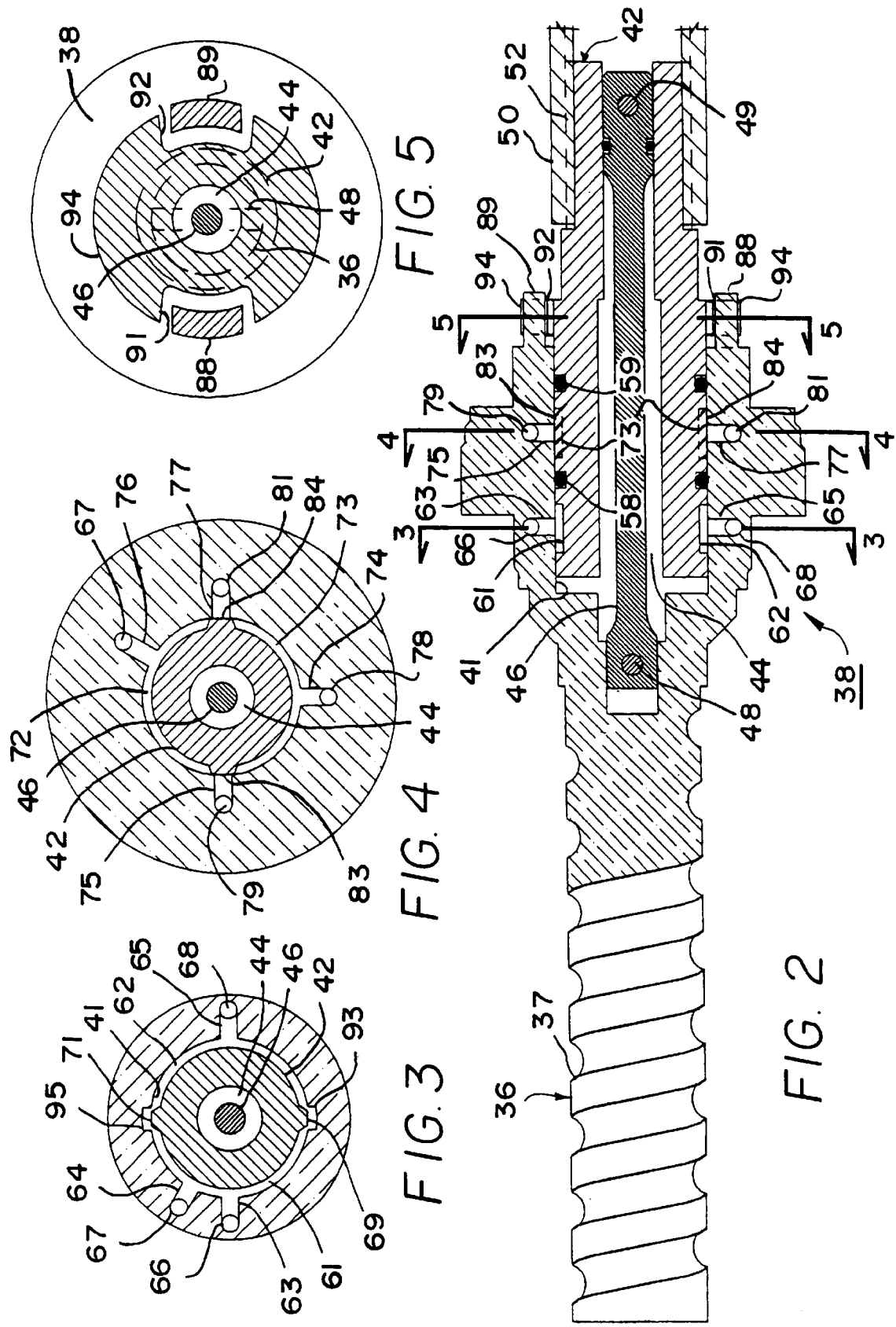

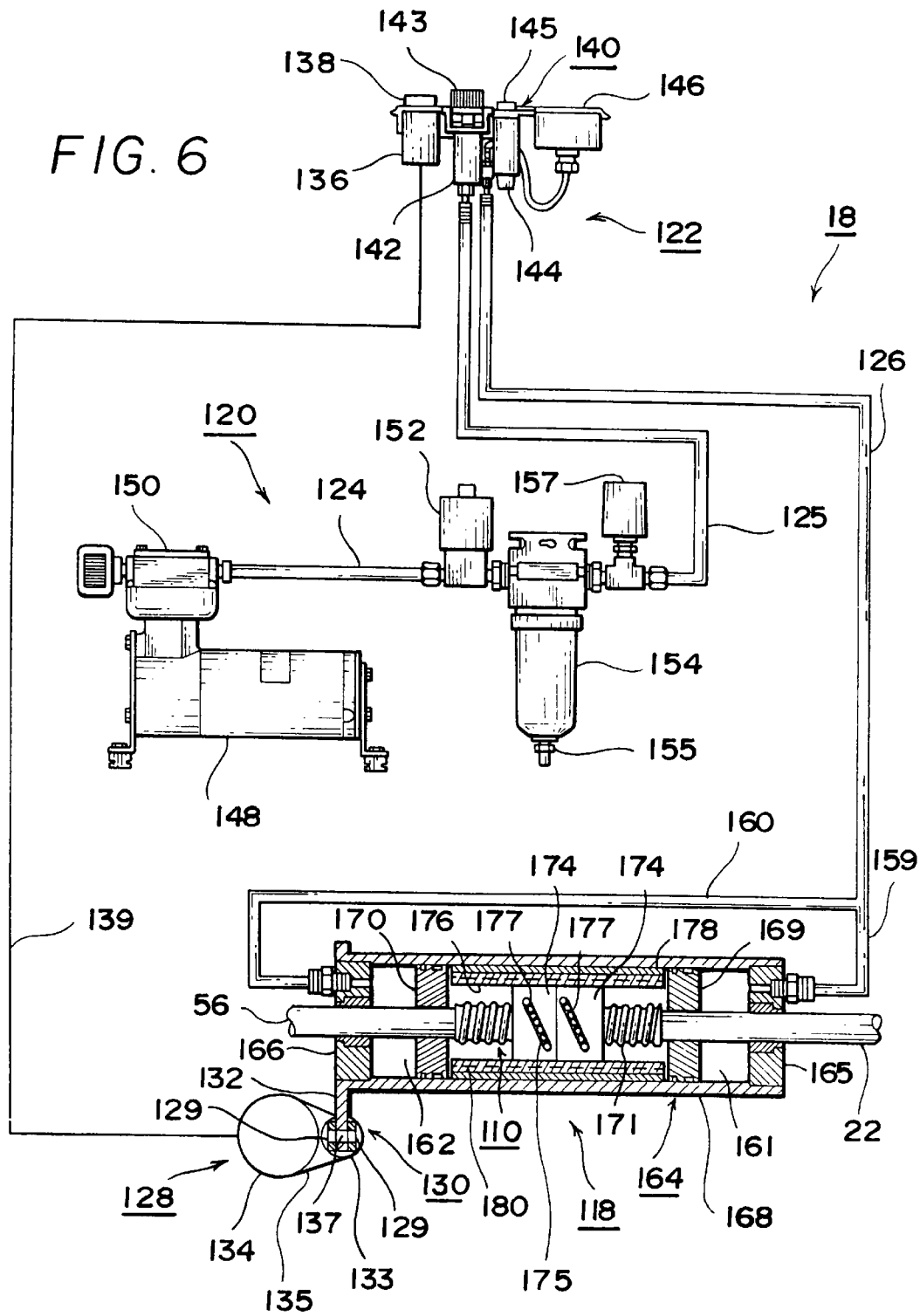

POWER STEERING SYSTEM WITH CONTROLLED CENTERING

FIELD OF THE INVENTION

This invention relates to vehicle steering systems, and more particularly to an improved power steering assembly for controlling the steerable wheels of a vehicle such as an automobile, a motor home, a bus, a truck or the like, so that a steering position for the steerable wheels is controlled both at center and away from center in spite of spurious influences on the steerable wheels, such as those caused by variable cross winds, crowned or slanted roadways, or other factors tending to adversely affect steering of the vehicle by the driver.

BACKGROUND OF THE INVENTION

Vehicles with steering systems having positive caster generally track relatively straight ahead and resist steering inputs away from center, including those of the driver, provided that the roadway they are travelling on is smooth and is not slanted or crowned. Such positive caster is provided by positive caster offset, which is also known as mechanical trail. Caster offset is the distance from the ground intersection point of a pivot line drawn through the pivot axis of a steerable wheel to a contact point at the center of the area over which the wheel contacts the ground. The pivot axis of a steerable wheel of a motor vehicle is usually provided by a "king pin". Because the contact point of a steerable wheel with positive caster trails the pivot line point of the wheel, side forces cause the wheel to turn in the direction that the force is being applied. A good example of this is the way in which the castered wheels on the front of a shopping cart are easily turned in the direction of applied force.

The adverse effects described below are some of the negative aspects of achieving steering stability with positive caster offset. Because of the side force applied by gravitational pull on a slanted or crowned highway, positive caster offset causes a motor vehicle to freely turn to the low side, creating a steering wheel pull that requires counteractive steering input from the driver to keep the vehicle from leaving the highway. The amount of driving fatigue that is directly caused by positive caster offset under these conditions may be appreciated by considering the many millions of miles driven by truck drivers and other motorists each day on crowned or slanted highways.

Another fatiguing driving condition that may be encountered by a motorist is that of controlling a crosswind steering input. The amount of adverse steering input caused by crosswinds is directly related to the amount of positive caster offset, which is a classic example of having to balance a benefit with a detriment. The small amount of stability gained from castering the steerable wheels on a non-windy day may be paid for many times over when driving in a crosswind because of the destabilizing effect of the crosswind when combined with positive caster offset. Positive caster offset also allows steering inputs from rutted and other imperfect roadway surfaces to steer back against the driver and thereby cause road wander, which is a universal driving complaint, particularly by driver's of heavy vehicles such as trucks and motor homes.

For the lack of a more advanced method, steerable wheel castering has been accepted by the industry as a low-cost method of achieving steerable wheel returnability. Thus, large, heavy over-the-road vehicles are presently provided with generous amounts of positive caster. Not much thought has been given to the self-defeating side effects of steerable wheel castering. Instead, the lack of directional stability is blamed on the size and weight of the vehicle.

As the size and weight of over-the-road vehicles increases, the need for directional stability becomes more important. Learning to drive a heavy vehicle means learning to control the back steer caused by the adverse side effects of steerable wheel castering. The failure of the industry to recognize the critical need to provide directional stability by replacing steerable wheel castering with another method of achieving steerable wheel returnability may go down in history as one of the longest enduring heavy vehicle design oversights.

The lack of directional stability is fundamentally the reason that heavy vehicle driving is much more stressful than it otherwise needs to be. Keeping a heavy vehicle, that is lacking in directional stability, tracking straight and under control for extended periods of time is a major cause of driving fatigue and related accident potential. The failure of numerous driver fatigue and alertness studies to consider the contribution made by "driving" fatigue in the overall evaluation is indicative of the wide-spread failure of the industry to recognize the lack of directional stability as the major cause of driver fatigue resulting from driving fatigue. Accordingly, a dramatic reduction in driver fatigue may be made by making heavy over-the-road vehicles directionally stable and thereby significantly reducing driving fatigue.

The term "directional stability" does not legitimately apply to the current production of heavy vehicles because they are, in fact, not directionally stable. The lack of heavy vehicle directional stability is not the fault of the steering gear. The purpose of past improvements in the art of steering gears and other steering components has been to make it easier for the driver to control the unstable behavior of castered steerable wheels. Irrespective of such refinements in the steering gear and related components, when the steerable wheels are allowed to caster, the driver will still have to make the same excessive number of steering corrections to control road wander, slanted road steering wheel pull, and down wind steerable wheel castering.

Thus, a highly important consideration that has long been overlooked by the industry is that steerable wheel castering is directly responsible for road wander, crowned road steering wheel pull and cross wind steering problems. Keeping an unstable heavy vehicle tracking straight and under control currently requires an inordinate amount of driver steering corrections to counteract the adverse side effects of castered wheels. The repetitive task of making thousands of precise steering corrections mile after mile weighs heavily on a driver's physical and mental well-being, and may result in extreme driving fatigue. Thus, vehicle directional stability especially for heavy vehicles can only be achieved by stabilizing the on-center behavior of the steerable wheels with a more suitable method than the traditional steerable wheel castering used on all current production vehicles.

SUMMARY OF THE INVENTION

It is believed that directional stability of motor vehicles, particularly heavy vehicles, can only be achieved by stabilizing the return-to-center and on-center behavior of the steerable wheels with a more suitable method than the traditional steerable wheel castering used on all current production vehicles. When the steerable wheels are prevented from castering, there is a considerable reduction in the amount of corrective steering required by the vehicle driver, resulting in a major reduction in driving fatigue.

Therefore, the purpose of the present invention is to provide on-center and return-to-center improvements in power steering systems for over-the-road vehicles by adding a steerable wheel holding feature to prior art power steering systems.

The primary function of present state of the art power steering systems is to assist the driver when turning away from center. When the driver releases the steering wheel after turning, a rotary valve in the steering gear returns to neutral. When this rotary valve is in its neutral position, the power steering gear has no influence on the direction of the steerable wheels. This arrangement or operating mode is called "free return" and allows the influence of the road surface and the steering geometry to cause the steerable wheels to return to a center position. In the center position, conventional power steering units do not control the steerable wheels except in response to corrective steering inputs transmitted from the driver through the steering shaft.

The present invention may be used to eliminate the free return mode of operation used in existing power assisted steering assemblies. When the free return mode is no longer provided, the steerable wheels will no longer be influenced by spurious steering inputs from the road surface and/or from the steering geometry. Instead, the steerable wheels will be kept tracking straight ahead in the on-center position, and will respond only to intentional steering inputs by the vehicle driver.

Instead of relying on positive castering, steering wheel returnability after a turning movement is provided by a steering shaft centering assembly, such as that described and shown in my U.S. Pat. No. 5,816,594 issued Oct. 6, 1998, the entire contents of which are expressly incorporated herein by reference. As described in this patent, the return to center influence of the centering assembly is preferably increased when the vehicle speed is increased to optimize vehicle directional stability. The combination of the present disclosure with that in my prior patent provides an overall power steering system that achieves directional stability in both light and heavy motor vehicles.

The invention therefore provides improved on-center and away-from-center control of the steering shaft and the steerable wheels, and significantly reduces driver fatigue resulting from driving fatigue because it results in a major reduction in driver steering inputs. Any positive castering present is overridden by this steering shaft control. The invention also eliminates the need for any positive castering by providing directional stability of the steerable wheels when there is no positive caster, i.e., a caster angle of zero degrees (0°). Thus, on-center tracking of the steerable wheels is achieved by a means that does not have the deficiencies inherent in positive caster offset, and that substantially reduces the need for corrective steering inputs from the vehicle driver. The positive on-center feel of such a directionally stable vehicle provides a new level of driveability for motor vehicles, including automobiles, trucks, buses, campers and motorized homes. The invention thus attains new levels of directional stability and driveability, which reduce driver fatigue to a level that cannot be achieved by conventional positive caster centering.

The replacement of steerable wheel castering with the power centering technology of the present invention has a number of additional advantages. These include precision on-center directional stability of the steerable wheels that make the vehicle more comfortable to drive a corresponding reduction in accident potential due to the considerable reduction in driving fatigue, improvement in steerable wheel blowout protection and related safety, improvement in the tire wear pattern of the steerable wheels that increases tire life and reduces maintenance costs, a stable non-swaying ride that improves passenger comfort particularly in buses and other large vehicles, and lower insurance costs due to significant improvements in overall vehicle safety.

The foregoing advantages are achieved by an on-center holding system incorporated into the power steering system of the present invention. The power steering system comprises a power unit, a valve unit and a centering unit. The power unit comprises a power piston for actuating the pitman arm of a vehicle steering system. The power piston reciprocates in a power cylinder to provide power assisted steering and is driven by a worm connected to the steering shaft for rotation in response to either the centering unit or the vehicle steering wheel. The valve unit is connected between the worm of the power unit and a steering shaft segment from the centering unit. A rotary valve member is fixed to the steering shaft segment and rotatably received in the bore of a sleeve fixed to the worm. The sleeve is connected to the rotary valve member through a torsion rod arranged to actuate a pair of spool valves formed by valving elements on the body of the rotary valve and in the bore of the sleeve.

The spool valves are arranged in series to provide hydraulic fluid pressure to the power unit only while the steering shaft is being turned by either the steering wheel or the centering unit. Thus, it is only during such turning movement that pressurized hydraulic fluid is supplied from the first spool valve to the second spool valve and from the second spool valve to the power cylinder. In the absence of such turning movement, the first spool valve recirculates pressurized hydraulic fluid from an hydraulic pump to an hydraulic fluid reservoir. At least one of the embodiments prevents free return of the power unit to center after an away-from-center turning movement. In this embodiment, the returnability of the steering system to its center position is dependent upon rotation of the steering shaft by either an automatic return force from the centering unit or a manual return force from turning of the steering wheel towards center by the vehicle driver. However, since automatic return to center is always available from the centering unit, there is no need for manual return by the driver. The invention thereby provides improved on-center control of the steering shaft and the steerable wheels, and significantly reduces driving fatigue because it results in a significant reduction in the driver steering inputs required for on-center tracking of the steerable wheels.

The preferred embodiments of the present invention may also include the following features: a resistance force for opposing steering movement away from center, a return force for return to center of sufficient magnitude to overcome spurious steering inputs, remotely variable levels of resistance force and return force through a predetermined range of turning movement, a remotely trimmable center position, no substantial overshoot, a fail-safe mode for disabling the centering assembly in the absence of power steering, precision centering, dampening of erratic steering movements, compact size, economical to manufacture and install, utility for old and new vehicles with power steering, and distinctive driver road feel.

BRIEF DESCRIPTION OF THE DRAWINGS

The invention, both as to its structure and operation, may be further understood by reference to the detailed description below taken in conjunction with the accompanying drawings in which:

FIG. 2 is a enlarged, partially sectional, plan view of the valve unit of FIG. 1;

FIG. 3 is a transverse sectional view taken along line 3—3 of FIG. 2;

FIG. 4 is a transverse sectional view taken along line 4—4 of FIG. 2;

FIG. 5 is a transverse sectional view taken along line 5—5 of FIG. 2;

FIG. 6 is a schematic diagram of the fluid and electrical systems for operating the centering unit of FIG. 1, and includes a left side elevational view in partial section showing additional structural details of the centering unit, including a trim assembly for trimming the center position of the steering system.

FIG. 7A is an enlargement of the detail structure identified by circle A in FIG. 7;

DETAILED DESCRIPTION OF THE PREFERRED EMBODIMENTS

Figure 1:
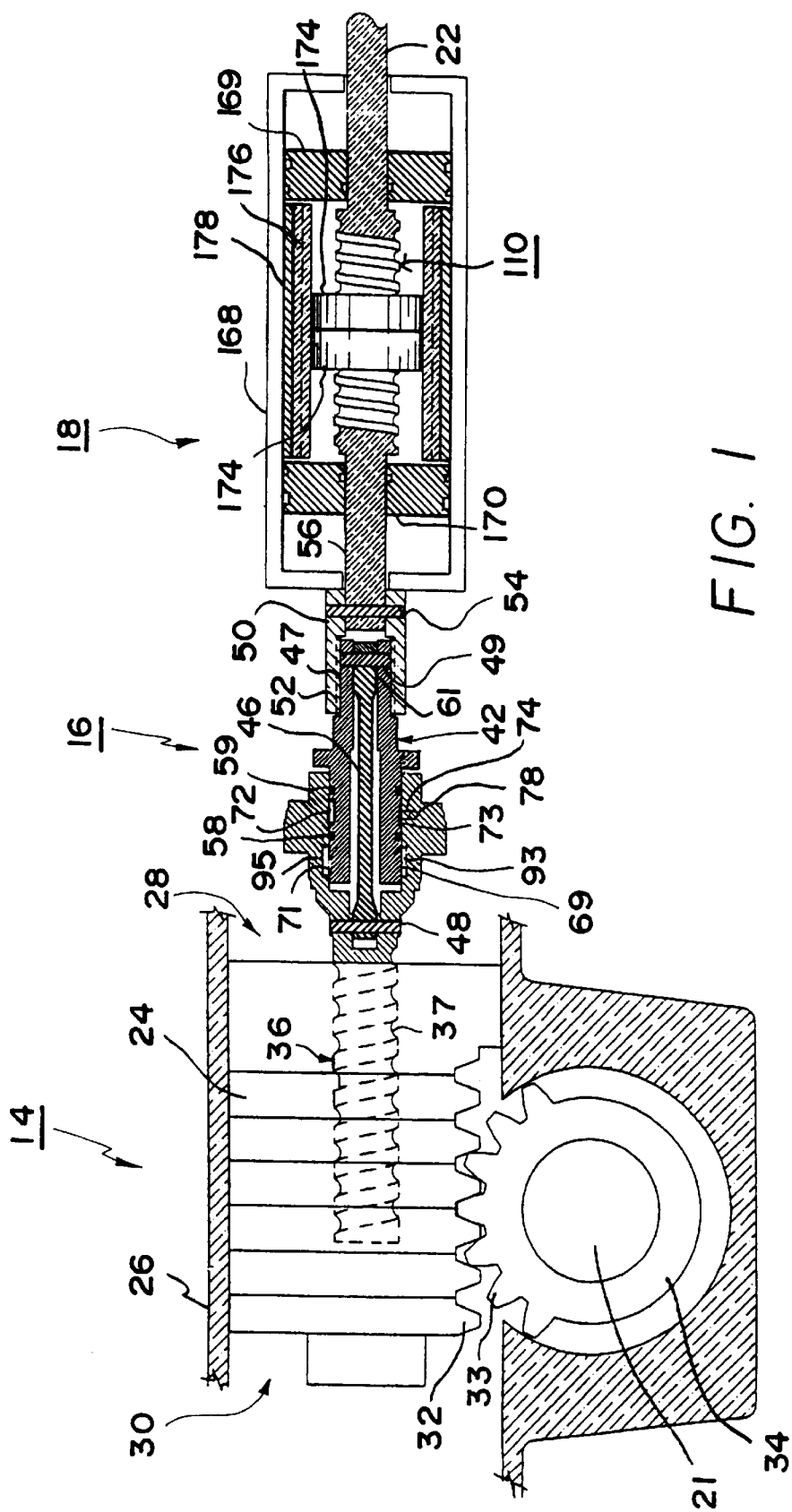
FIG. 1 is a fragmentary, partially sectional, left side elevational view showing the interconnection of the main components of the invention.

Referring to FIG. 1, the power steering assembly of the present invention comprises a power unit generally designated 14, a valve unit generally designated 16, and a centering unit generally designated 18. These units are connected in series between the shaft 21 of a conventional pitman arm 20 (FIG. 7) and a steering column or shaft 22 on which is mounted the usual steering wheel (now shown).

The power unit 14 includes a power piston 24 confined within a power cylinder 26 between a right power chamber 28 and a left power chamber 30. The power cylinder 26 has rack teeth 32 meshing with peripheral teeth 33 of a sector gear 34 fixed to or integral with the pitman arm shaft 21. Shaft 21 carries the pitman arm 20 that is connected through steering linkages (not shown) to at least one steerable wheel of a vehicle.

Piston 24 has a bore that is helically grooved internally in a manner complimentary to the helical groove of a power worm 36 received within the bore of piston 24. Balls confined and traveling within the channel formed by the complimentary piston and worm grooves constitute the connection between the piston and the worm, and a return tube (not shown) is provided to allow for circulation of the balls in a manner well known in the art and as shown, for example, in U.S. Pat. No. 3,022,772, to Zeigler et al., the entire contents of which are incorporated herein by reference.

The power worm 36 has a flanged base forming a sleeve 38 with a bore 40 for rotatably receiving a rotary valve member 42, which in turn has a central chamber 44 for accommodating a torsion rod 46. The distal end of the torsion rod is staked by a pin 48 to an intermediate section of the power worm 36 between its threaded portion 37 and its sleeve 38. The proximate end of the torsion rod 46 is staked by a pin 49 to an end segment 47 of the rotary valve member 42 projecting beyond the sleeve 38. The rotary valve end segment 47 is connected to an end segment 56 of the steering shaft 22 by a hollow coupling 50 having internal splines engaging external splines 52 on the end segment 47 of rotary valve member 42. The opposite end of the coupling 50 is staked by a pin 54 to the steering shaft end segment 56. The steering shaft end segment 56 is an extension of steering shaft 22 as described further below in connection with the structural details of the centering unit 18. Since the sleeve bore 40 and the central chamber 44 contain hydraulic fluid, the rotary valve 42 incudes fluid seals 58 and 59, and the torsion rod includes a fluid seal 61. Each of these fluid seals may be of the O-ring type.

Referring now to FIGS. 2–5, a first spool valve 60 is formed by a pair of grooves 61 and 62 and a pair of lands 69 and 71 extending around segments of the periphery of rotary valve member 42, and by a plurality of ports 63, 64 and 65 and corresponding conduits 66, 67 and 68 in the bore wall of sleeve 38. Fluid flow through the ports 63, 64 and 65 and the corresponding conduits is controlled by the lands 69 and 71, which form barriers between the grooves 61 and 62. The lands 69 and 71 extend axially and also cooperate respectively with axial grooves 93 and 95 in the wall of sleeve bore 40 to provide a by-pass flow for recycling fluid to a hydraulic reservoir 98 as described below.

A second spool valve 70 is formed by a pair of grooves 72 and 73 and a pair of lands 83 and 84 extending around segments of the periphery of the valve member 42, and by a plurality of ports 74, 75, 76 and 77 in the bore wall of sleeve 38. Ports 74, 75, 76 and 77 lead to sleeve conduits 78, 79, 80 and 81, respectively. Fluid flow through these ports and conduits of spool valve 70 is controlled by the lands 83 and 84, which form barriers between the grooves 72 and 73.

The rotary valve unit 16 operates as follows. Since the power worm 36 is connected to the steering load through the power piston 24 and sector gear 34, movement of the worm sleeve 38 is resisted by the steering load, which includes the steerable wheels and steering linkages (not shown) downstream of the pitman arm 20. The distal end of the torsion rod 46 is also connected to this load through the pin 48. On the other hand, the rotary valve member 42, which is connected to the proximate end of the torsion rod 46 by the pin 49, is under no preload when the steering shaft 22 and the attached steering wheel are centered. Therefore, on rotation of the steering shaft 22, either by the steering wheel or by the centering unit 18, the torsion rod 46 immediately begins to twist and such twisting results in rotary movement of the valve member 42 relative to the worm sleeve 38, which causes actuation of the spool valves 60 and 70 as described below in more detail with reference to FIGS.

7–10. When such a turning effort imposed on steering shaft 22 ceases, the torsion rod immediately untwists to relieve its tension, and thereby returns the valve member 42 to its neutral position relative to the worm sleeve 38. The torsion rod 46 thus tends to maintain the valve member 42 in the neutral position relative to the worm sleeve 38 as is shown in FIGS. 3–4.

As shown in FIG. 5, the rotary movement of valve member 42 in either direction around the longitudinal axis of the torsion rod 46 is limited by a pair of tangs 88 and 89 projecting axially from worm sleeve 38 so as to be received in a corresponding pair of radially aligned slots 91 and 92 extending axially through a radial flange 94 mounted on or made integrally with an intermediate portion of valve member 42 extending between the sleeve and coupling 50. Since the clearance between the worm tangs 88 and 89 and the opposing sidewalls of slots 91 and 92 permit only limited relative motion between the worm 36 and valve member 42, this tang and slot arrangement constitutes a fail-safe mechanism that enables manual steering of the vehicle in the event of hydraulic failure. In other words, engagement between each tang and a sidewall of its corresponding slot mechanically rotates worm 36, which thereby moves power piston 24 and causes turning movement of the steerable wheels through the pitman arm 20. When hydraulic fluid is available, the power piston 24 is energized hydraulically as described below.

The steering column centering unit of the present invention may be the same as one of those described in my previously referenced U.S. Pat. No. 5,816,594. Thus, centering unit 18 comprises a centering worm 110 connected into or made integrally with the steering shaft 22 of a motor vehicle as shown in FIG. 6 of the drawings. The centering unit 18 comprises a centering assembly 118, to which pressurized air is supplied from an air supply assembly 120 via a control assembly 122, these assemblies being interconnected by appropriately sized air lines 124, 125 and 126.

The centering unit 18 also includes a trim assembly 128 connected to the centering assembly 118 by a pivot connection 130 and a trim flange 132. Pivot connection 130 comprises a pair of apertured ears 129, 129 projecting axially from the distal end of a trim screw 133, and an aperture 137 in trim flange 132. A bolt secured by a nut (not shown) passes through the apertures to pivotally connect the flange 132 to the trim screw ears 129, 129.

The trim assembly 128 also includes a reversible electric motor 134 connected to a trim switch 136 by an electrical line 139. The trim switch 136 includes a trim toggle 138 on a control panel 140, which preferably is located at or near the driver's station of the vehicle. The trim toggle 138 actuates an electrical switch of a toggle design that is spring-biased to a circuit-open position. Such switches are closed only momentarily when the toggle is held in an actuated position against the spring bias. Thus, the trim adjusting motor 134 is actuated only while the toggle 138 is pushed. Release of the toggle 138 opens a circuit and stops the trim adjustment at the point selected. Trim toggle 138 has two actuating positions, one for trimming the steering wheel to the right (clockwise) and the other for trimming the steering wheel to the left (counterclockwise).

Also mounted on the control panel 140 is an air pressure regulator 142 having a manual adjustment knob 143, an on/off power switch 144 having a push button 145, and an air pressure gauge 146. Pressurized air is supplied to the air pressure regulator 142 by the air supply assembly 120, which comprises an air compressor 148, an intake and discharge manifold 150, a solenoid actuated dump valve 152 for depressurizing the air supply assembly, an air filter and dryer unit 154 having a moisture drain valve 155, and an adjustable pressure actuated cut-off switch 157 for cutting the air compressor on and off depending the desired output pressure. Air pressure above that desired for operating the centering assembly is supplied from supply assembly 120 to regulator 142 by the air line 125, and then the desired regulated air pressure is supplied to the centering assembly 118 via the regulated air supply line 126 which supplies two branch air lines 159 and 160. Branch line 159 supplies pressurized air to a first pressure chamber 161, and branch line 160 supplies pressurized air to a second pressure chamber 162 of a centering cylinder 164 having a first end wall 165 and a second end wall 166.

The centering cylinder 164 comprises a cylindrical housing 168 which, together with the end walls 165 and 166, encloses the two separate interior pressure chambers 161 and 162, chamber 161 containing a centering piston 169 and chamber 162 containing a centering piston 170. The centering worm 110 is rigidly fixed between the main steering shaft 22 and the steering shaft end segment 56, and is engaged by one or more ball nuts, such as a pair of ball nuts 174, 174. The ball nuts are rigidly fixed to a splined inner guide 176, the splines of which are intermeshed with the splines 180 of an outer guide 178. Outer guide 178 is rigidly fixed to the inside wall of cylindrical housing 168.

The centering worm 110 and the connected steering shaft segments of 22 and 56 rotate with the steering wheel, and therefore the shaft segment 22 is journaled for rotation in the end wall 165 and shaft segment 56 is journaled for rotation in end wall 166. The end walls 165 and 166 contain appropriate packing and/or bearings permitting such rotation, and also contain appropriate seals for maintaining pressurized air within the pressure chambers 161 and 162.

The way in which the components of the centering unit center and stabilize a vehicle steering system will now be described with reference to FIG. 6. The pistons 169 and 170 are journaled by appropriate seals and packing and/or bearings for both rotational and sliding movements relative to the shaft segments 22 and 56, respectively. Since the intermeshing of the splines of the inner guide 176 and outer guide 178 prevent rotation of the ball nuts 174, 174, rotation of the centering worm 110 in response to turning of the steering column by the steering wheel causes the ball nuts 174, 174 to advance axially along the worm, depending on the direction of rotation of the steering wheel.

Figure 12:
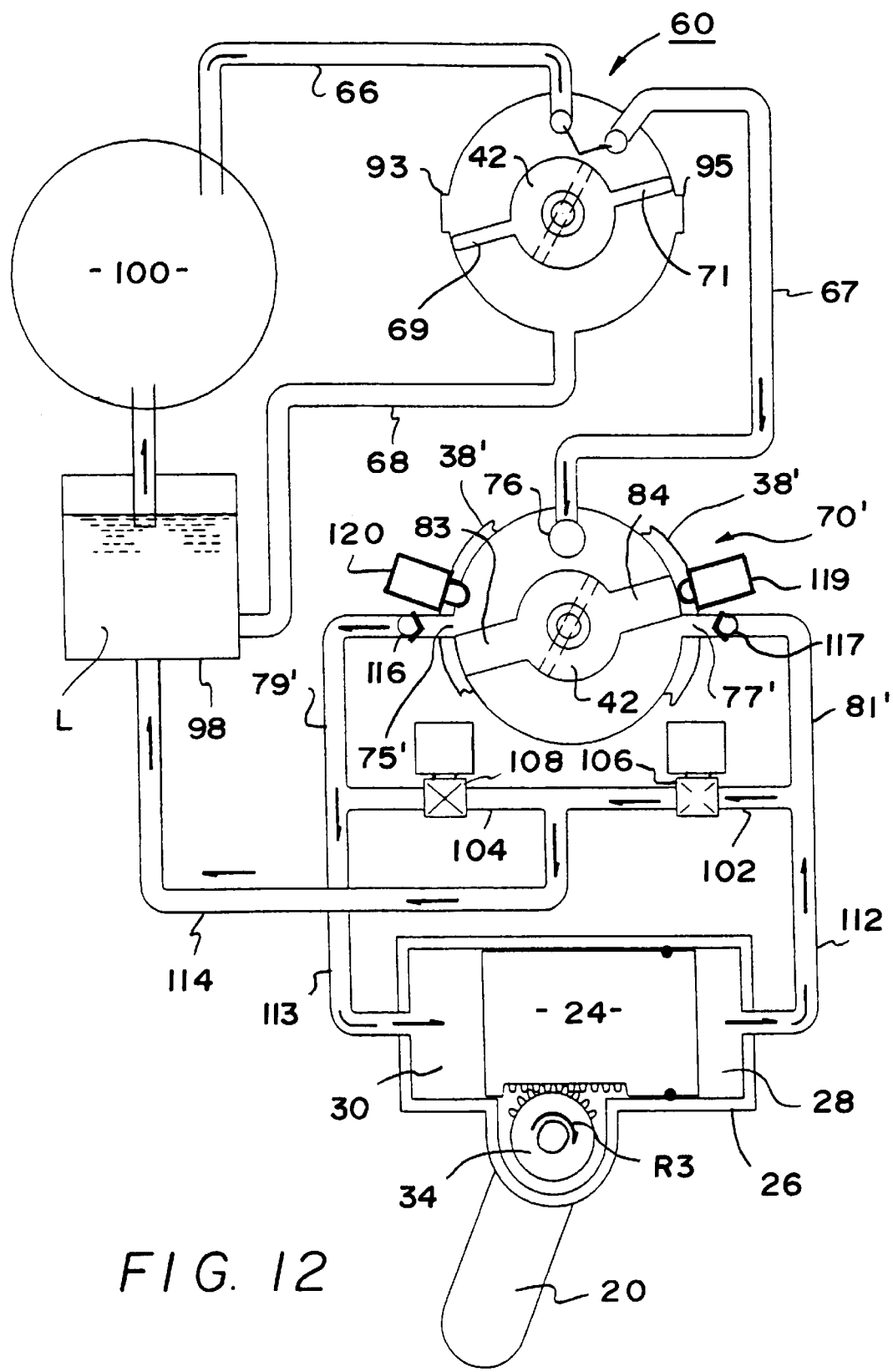
FIG. 12 is a diagrammatic illustration of the modified power steering system of FIG. 11 during away-from-center movement of the steering wheel toward a left turn position; and, FIG. 13 is a left side elevational view in partial section showing the centering unit of the invention when the modified power steering system is in the left turn position of FIG. 12.

For example, such rotation of the worm 110 for a left turn where rotation of the steering wheel is counterclockwise will cause the inner guide 176 to move toward the right side along with the ball nuts to which it is rigidly fixed, as may be seen in FIG. 12. This in turn will cause the inner guide 176 to drive piston 169 toward the right against the action of the air pressure in chamber 161. In other words, since rotation of the ball nuts is prevented by the intermeshing of the splines of the inner and outer guides, rotation of the centering worm 110 causes the ball nuts and the inner guide to advance along the axis of the worm.

During rotation of the worm 110, the balls 175 travel continuously around groove races of the ball nuts and in corresponding portions of the spiral worm groove 171. The race of each ball nut is also in the form of a spiral groove and the balls traveling in this spiral race are returned from the end of this race to the beginning of this race via an external return race 177, which is the usual structure of ball worm and nut assemblies. One such assembly is available as a Rockford Ball Screw Assembly from Rand Industries, Inc., of Rockford, Ill. The power piston 24 is driven by the balls between it and the power worm 36 in the same manner as the balls 175 drive to ball nuts of the centering unit 18.

Pistons 169 and 170 are both arranged for compressive movement toward the opposite ends of their respective centering chambers by a corresponding advance of the inner guide 176, piston 169 traveling in chamber 161 and piston 170 traveling in chamber 162 within the cylinder 164. The air pressure in chambers 161 and 162 thereby resiliently opposes rotary motion of the steering wheel away from the selected center position by reason of the interaction between balls 175 of the ball nuts and the spiral groove 171 of the worm 110. Thus, movement of the ball nuts 174, 174 from their centered position shown in FIG. 6 is resisted by the fluid pressure in chambers 161 and 162, such that a resistance force opposes off-center movement of both the steering wheel and the steerable wheels.

Figure 13:
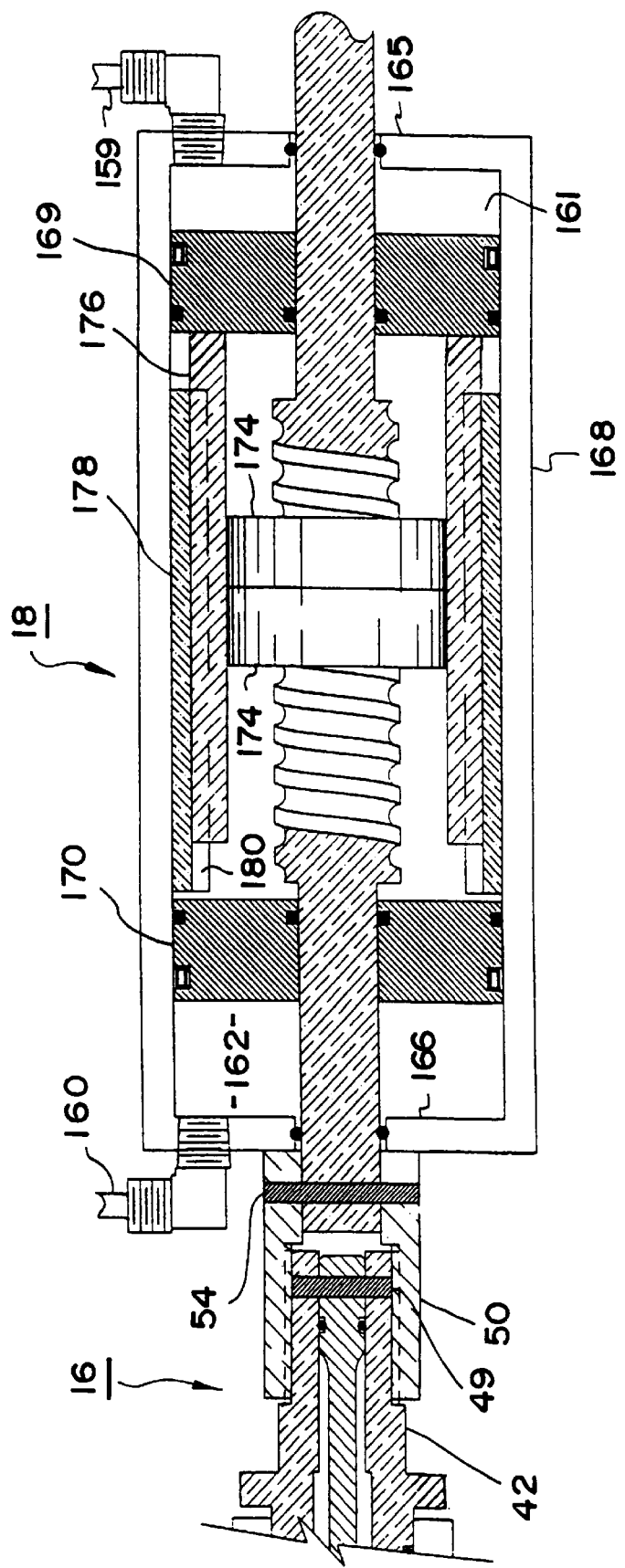

Similarly, while the ball nuts are moved away from their centered or neutral position, as is shown for a left turn in FIG. 13, the fluid pressure in chambers 161 and 162 applies a return force to the worm 110 by creating a resilient bias on the corresponding piston, which is transmitted to the worm 110 through the displaced inner guide 176 and the ball nuts 174, 174. The bias will return all of the power steering system components to their center positions upon release of the steering wheel by the driver. This return force also will cause the steering wheel and the steerable wheels to return to their centered positions.

Provision is also made to remotely "trim" the center position of the steering shaft, and thereby the centering of the steerable wheels of the vehicle, in order to compensate for changes in extraneous steering forces that would otherwise cause the vehicle to drift off of its straight ahead course and require driver manipulation of the steering wheel. Trimming is accomplished by rotating the cylindrical shell 168 of the centering cylinder 164. As previously indicated, the trimming assembly 128 includes a trim flange 132 projecting laterally from and affixed to the shell 168 of centering cylinder 164. The distal end of flange 132 is connected by the pivot connection 130 to the threaded trim screw 133, which may be of the ball or ACME type. Screw 133 is extended and retracted in the direction of the plane of the flange 132 by a screw driving mechanism (not shown) enclosed in a housing 135 and connected to motor 134. Examples of trimming movements for changing the selected center position of the steering shaft 22 are illustrated diagrammatically and described in the above referenced U.S. Pat. No. 5,816,592.

The remotely controlled trim assembly 128 operates as follows. If there is a roadway pull to the right, straight ahead travel will require a compensating steering force to the left from the end segment 56 of the steering shaft 22 to provide straight ahead travel of the vehicle. This compensating force may be provided by a "power trim" in which the trim toggle 138 is pushed momentarily to a left trim position to briefly operate the reversible motor 134 in its left trimming mode until the roadway pull to the right is eliminated. The steering wheel, as well as the steerable wheels, will then be in a new "trimmed" position. Alternatively, while holding the steering wheel to the left in a position giving straight ahead travel, the trim toggle 138 is pushed momentarily to its left trim position to briefly operate the reversible motor 134 in its left trimming mode until the steering wheel will remain in the new "trimmed" position when released by the driver.

After its momentary actuation, the trim toggle 138 is released to stop the motor 134 and thereby lock the centering cylinder 164 in its new "trimmed" position, in which centering worm 110 has been caused to rotate into a new center position, which corresponds to a changed position of the ball nuts 174, 174 along the worm axis due to the trimming rotation of cylinder 164. This new on-center position of worm 110 will then maintain the vehicle steering system in a newly centered condition providing straight ahead travel of the vehicle that is free from the previously experienced roadway pull to the right and will be maintained even when the steering wheel is released.

Figure 7:
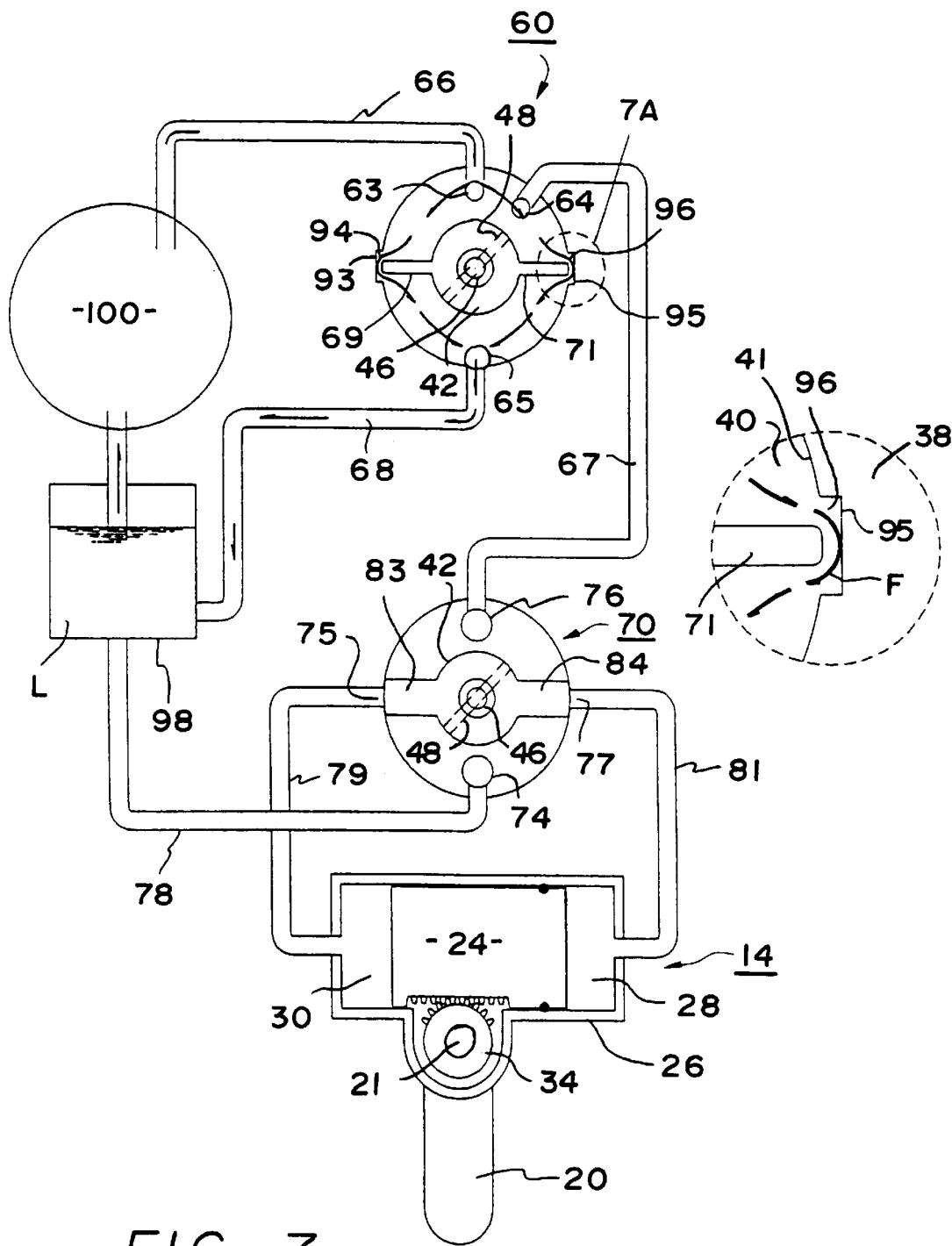
FIG. 7 is a diagrammatic illustration of the power steering system when the vehicle steering wheel is in its neutral position.

Operation of the power steering system, in response to either the steering wheel or the centering unit, will now be described with reference to FIGS. 7–10. In FIG. 7, the power steering system of the invention is shown in a neutral position in which the pitman arm 20 is centered in the position corresponding to the selected center position of the steerable wheels. The vehicle is thereby steered on a true straight ahead course as established by the centering unit 18. In this neutral position, the lands 69 and 71 of the valve member 42 are located so that the spool valve 60 allows the output of the hydraulic fluid pump 100 to recirculate to the fluid reservoir 98 through supply conduit 66, supply port 63, spool valve 60, recycle port 65, and recycle conduit 68.

To provide recirculation flow around the lands 69 and 71, respectively, grooves 93 and 95 are provided in the wall 41 of bore 40 of worm sleeve 38 to form respective by-pass flow passages 94 and 96, as illustrated by arrows F and shown in greater detail in FIG. 7A. In this configuration, fluid flow to the power unit 14 via conduits 79 and 81 is prevented by the second spool valve 70, in which the lands 83 and 84 block the corresponding left port 75 and right port 77. The lands 83 and 84 also block flow through the return port 74, which is connected to the reservoir 98 via the return line 78.

Figure 8:
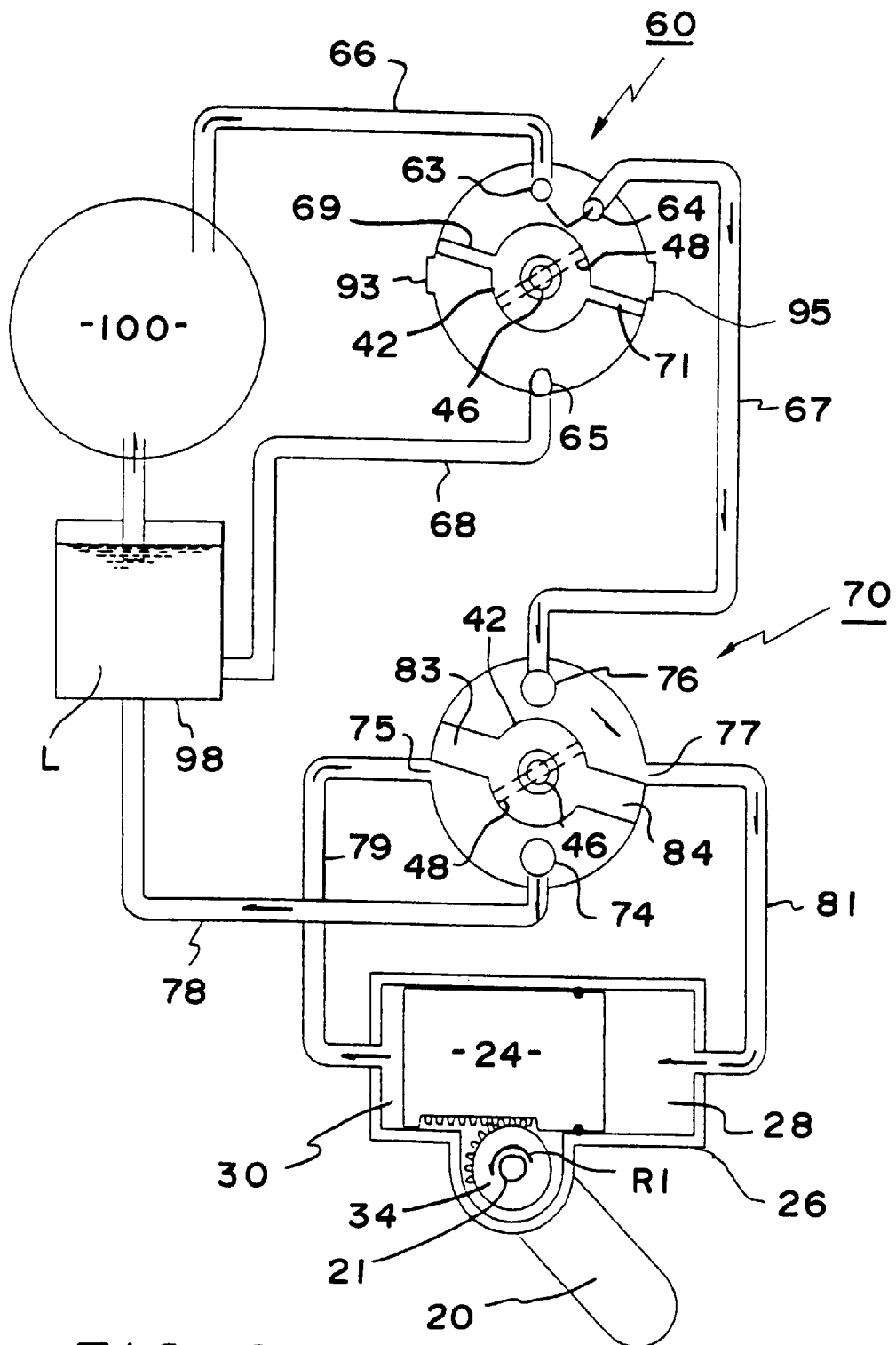
FIG. 8 is a diagrammatic illustration of the power steering system during away-from-center movement of the steering wheel toward a right turn position.

In the configuration shown in FIG. 8, the steering wheel is turning the steering shaft 22 to the right for a right turn such that rotation of the valve member 42 leads the rotation of sleeve 38 and thereby twists the torsion rod 46. The relative motion thereby produced between valve member 42 and worm sleeve 38 actuates both spool valve 60 and spool valve 70. Actuation of spool valve 60 shuts off recycle port 65 to prevent fluid recycle through conduit 68, and thereby allows inlet port 63 to pressurize outlet port 64 for providing fluid flow to spool valve 70 through conduit 67. Simultaneous actuation of spool valve 70 connects its inlet port 76 to its right port 77, which directs the fluid flow from pump 100 through right conduit 81 to the right power chamber 28. Valve 70 actuation also connects left port 75 to return port 74 such that power piston 24 moves to the left in cylinder 26 and discharges fluid from left power chamber 30 to reservoir 98 via left conduit 79, left port 75, return port 74 and return conduit 78.

Figure 9:
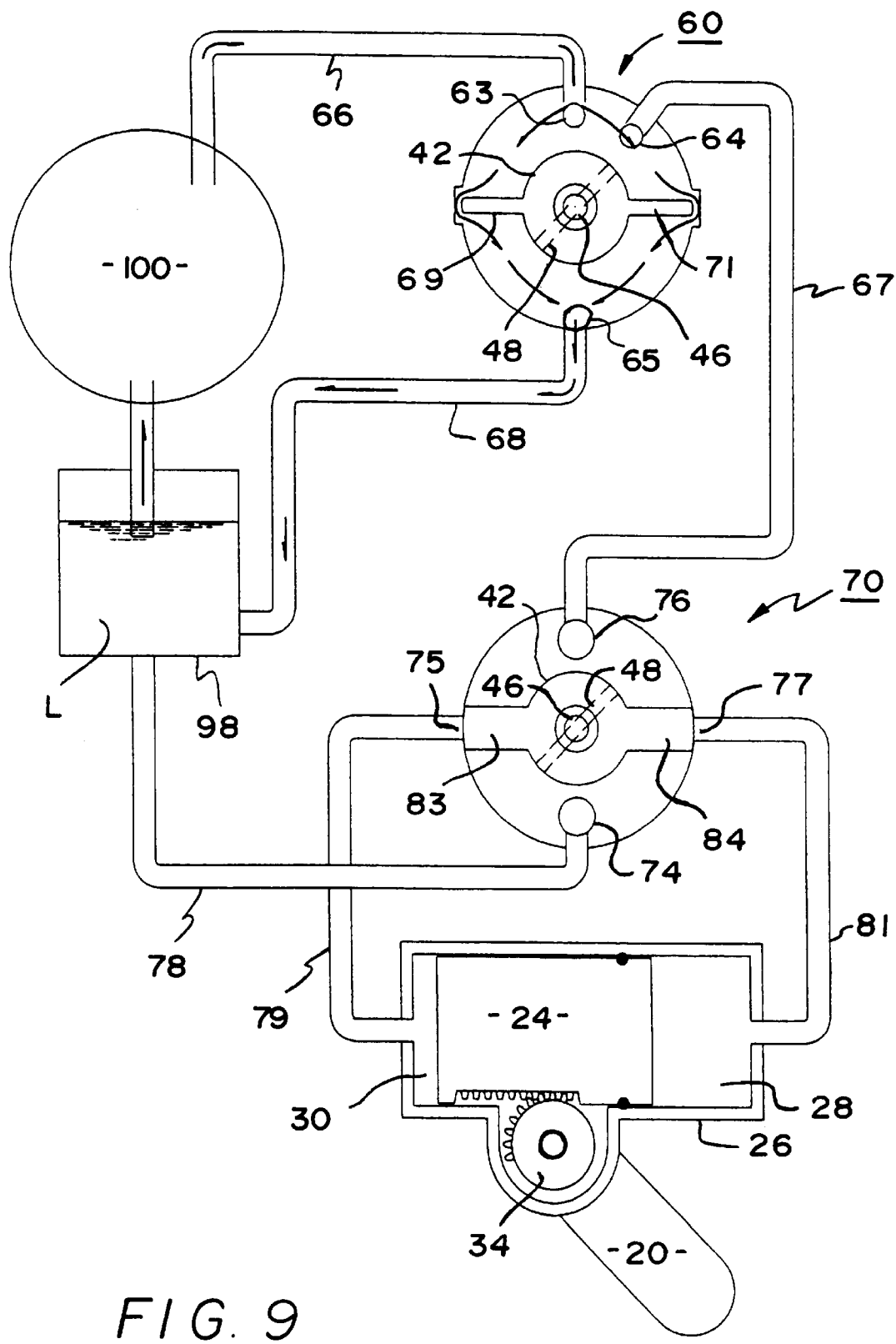
FIG. 9 is a diagrammatic illustration of the power steering system when the steering wheel is held at a static right turn position during a right turn of the vehicle.

FIG. 9 illustrates the configuration of the power steering system where the steering wheel and steering shaft 22 are held in a static right turn position. In this operating mode, the turning effort imposed on steering shaft 22 has ceased such that torsion rod 46 immediately untwists to restore valve member 42 to the same neutral position as illustrated in FIG. 7. Since rotary valve 60 is again bypassing fluid flow to reservoir 98 through conduit 68 and spool valve 70 is not permitting any flow to or from power cylinder 26, power piston 24 is locked in the same right turn position as shown in FIG. 8.

Figure 10:
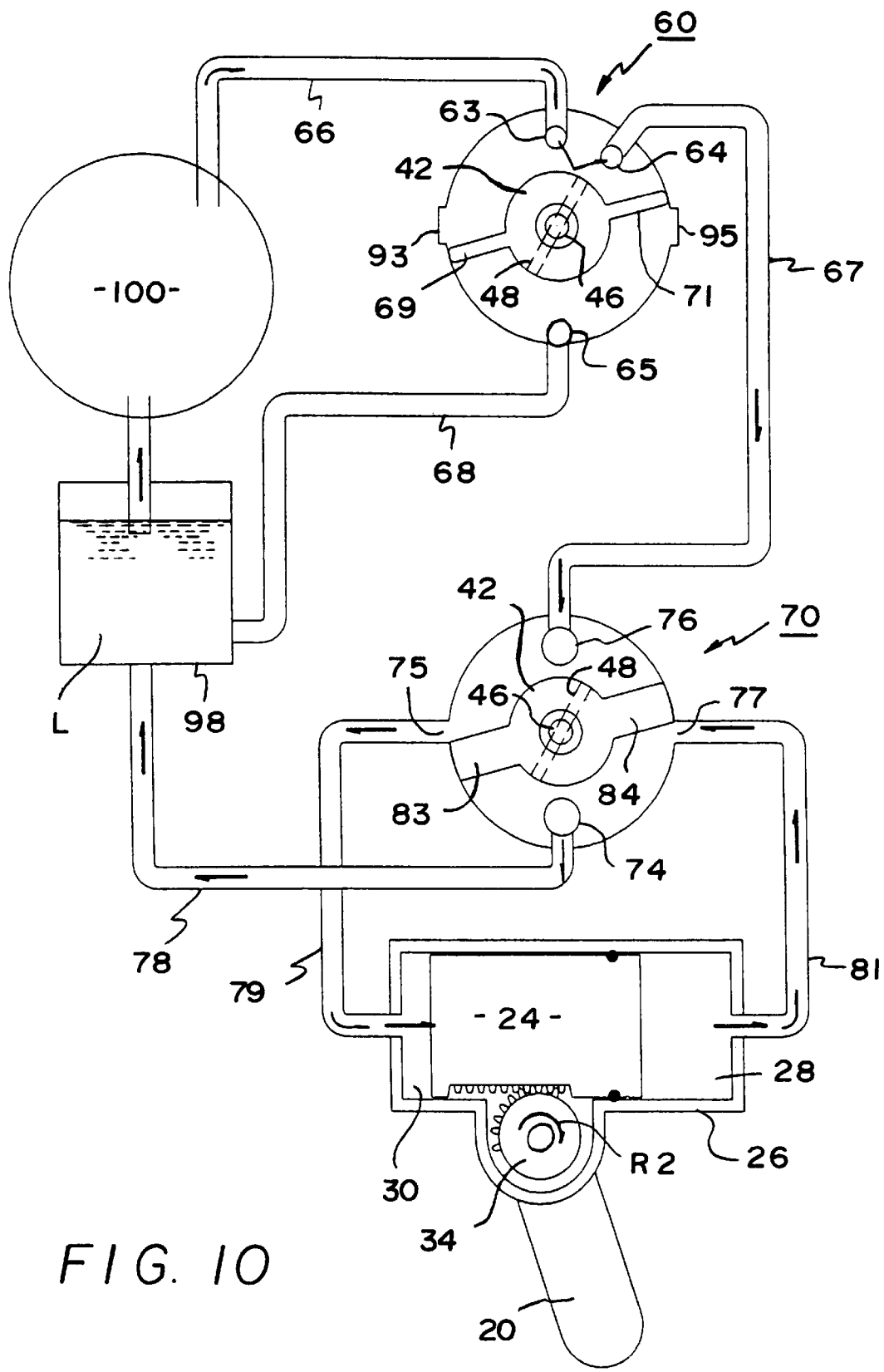
FIG. 10 is a diagrammatic illustration of the power steering system during return-to-center movement of the steering shaft from a right turn position in response to the centering unit of FIG. 1 upon release of the steering wheel by the driver.

In the configuration shown in FIG. 10, the vehicle steering system is being returned from the static right turn position of FIG. 9 to its centered position, either by driver manipulation of the steering shaft 22 through the steering wheel or by actuation of the steering shaft 22 by the centering unit 18 upon release of the steering wheel by the driver. The torque thus produced in the steering shaft segment 56 causes the torsion rod 46 to twist, and such twisting causes rotary movement of valve member 42 to lead rotary movement of sleeve 38. This relative movement produces the spool valve configuration shown in FIG. 10.

In this configuration, the lands 69 and 71 of the spool valve 60 are blocking flow to the fluid reservoir 98 via recycle port 65 and recycle line 68, and the lands 83 and 84 of the spool valve 70 are directing fluid flow from the inlet conduit 67 and the inlet port 76 to the left chamber 30 of power cylinder 26 through left conduit 79. The hydraulic fluid in right power chamber 28 is released to the reservoir 98 through right conduit 81, right port 77, return port 74, and return conduit 78. The resulting pressure differential causes power piston 24 to move toward the right and sector gear 34 to rotate in the direction of arrow R2, thereby providing power centering back to the centered position of the vehicle steering system shown in FIG. 7. When the vehicle steering system reaches the centered position, the torque imposed on steering shaft segment 56 ceases, whereupon the torsion rod 46 immediately untwists to return the spool valves 60 and 70 to their neutral positions as shown in FIG. 7.

Figure 11:
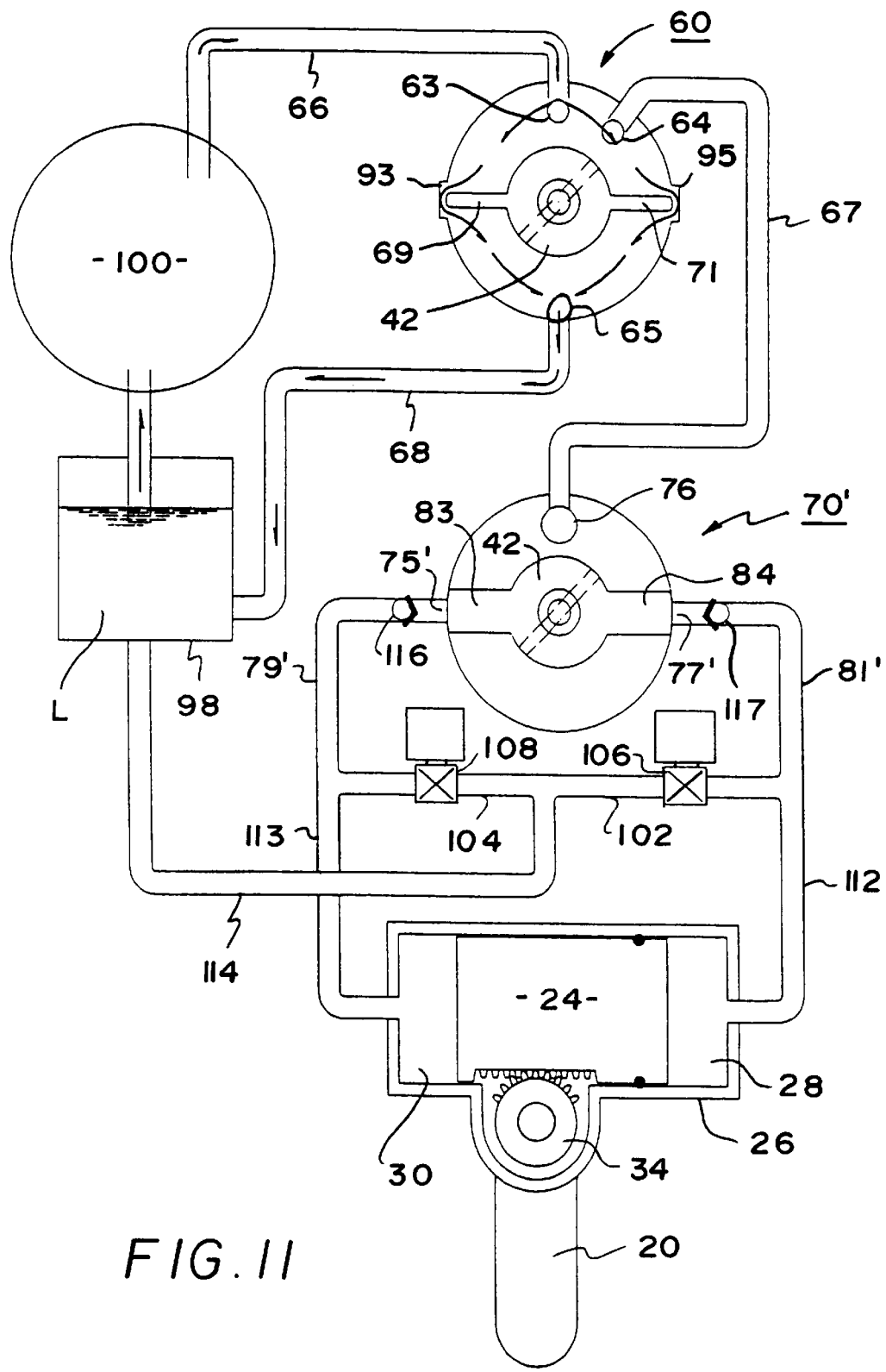
FIG. 11 is a diagrammatic illustration showing a modification of the power steering system of the invention with the vehicle steering system is in its center position.

Referring now to FIGS. 11–12 of the drawings, there is shown a modification of the power steering system of FIG. 7 wherein the spool valve 70 is replaced by a modified spool valve 70' such that the return port 74 and return conduit 78 of spool valve 70 are replaced by a pair of return lines 102 and 104 for returning fluid to the hydraulic fluid reservoir 98 from the respective power chambers 28 and 30 of the power unit 14. Return conduits 102 and 104 respectively contain electrical solenoid valves 106 and 108, and return fluid to the reservoir 98 via a joint return conduit 114 upon opening of the corresponding solenoid valve. In other words, when left turn solenoid valve 106 is open, fluid may flow from depressurized right power chamber 28 to the reservoir 98 via conduits 112, 102 and 114; and when right turn solenoid valve 108 is open, fluid may flow from depressurized left power chamber 30 to reservoir 98 via conduits 113, 104 and 114.

The right conduit 112 is connected to the right port 77' of spool valve 70' via a conduit 81', and the left conduit 113 is connected to the left port 75' of spool valve 70' via a conduit 79'. Although most reverse flow will be blocked by lands 83 and 84 of valve member 42, the conduits 79' and 81' may contain respective check valves 116 and 117 to prevent any reverse flow to the modified spool valve 70' when the corresponding solenoid valve is open to discharge the corresponding depressurized power chamber to the reservoir. The operation of check valves 116 and 117 is illustrated in FIG. 12 and described below with reference to that figure.

Operation of the modified power steering system during a steering system turning movement to the left is illustrated diagrammatically in FIG. 12. The solenoid valves 106 and 108 are actuated respectively by switches 119 and 120 mounted on the wall of a modified worm sleeve 38' and operated by lands 84 and 83, respectively, of valve member 42. Thus, valve member 42 will rotate counterclockwise for a left turn as shown in FIG. 12, and in doing so will operate the left turn electrical switch 119, thereby opening corresponding left turn solenoid valve 106. Similarly, right turn switch 120 will be operated by clockwise rotation of valve member 42 and thereby open right turn solenoid valve 108. Since switches 119 and 120 rotate with sleeve 38', the signals generated by these switches may be transmitted to the solenoids of valves 106 and 108 through sliding electrical contacts or as radio frequency signals.

In the FIG. 12 configuration, the valve member 42 has been rotated by the steering shaft end segment 56 and the torsion rod 46 has been twisted so that spool valves 60 and 70' are actuated to permit hydraulic fluid flow to pressurize left power chamber 30, causing the sector gear 34 to rotate in the direction of arrow R3. In this modified power steering system, the return flow from depressurized right power chamber 28 does not flow through the modified spool valve 70'. Instead, the return flow from depressurized right power chamber 28 flows through right conduit 112, and then through return conduit 102 and joint conduit 114 which are opened by actuation of solenoid valve 106 in response to operation of electrical switch 119 by the land 84 (or by an additional land) of valve member 84. Return flow from right power chamber 28 is prevented from back flowing through the modified spool valve 70' by check valve 117 and lands 83 and 84. During a right turn, back flow from left power chamber 30 through the modified spool valve 70' is prevented by check valve 116 and also by lands 83 and 84, which are then rotated in the direction opposite to that shown in FIG. 12.

The modification of FIGS. 11–12 also prevents free return to center of the pitman arm 20 because a solenoid valve will remain open only so long as the land 84 remains pressed against the switch 119 or the land 83 remains pressed against the switch 120, thereby providing a return flow path to the reservoir 98. In other words, the solenoid valves 106 and 108 will be actuated only when the torsion rod 46 is twisted by rotation of the valve member 42 relative to the worm sleeve 38. The left turn position of the centering unit 18, corresponding to the left turn of FIG. 12, is shown in FIG. 13.

Persons skilled in the art, upon learning of the present disclosure, will recognize that various modifications to the units and the components and elements of the units of the invention are possible without significantly affecting their functions. For example, other steering shaft centering units may be substituted for the centering unit 18 of the present invention. In this context, the term "centering unit" means any unit capable of applying torque to a steering shaft that tends to return it to a centered or straight-ahead position. Similarly, other power unit utilizing the same or other fluids may be substituted for the hydraulic power unit 14 of the invention. It is also possible to substitute an electric power unit wherein a reversible electric motor turns the sector gear 34 in response to actuation of pressure switches installed at the right and left ports 77 and 75 in place of conduits 79 and 81 and the portion of the fluid system downstream of these conduits. Accordingly, while the preferred embodiments have been shown and described in detail by way of example, further modifications and embodiments are possible without departing from the scope of the invention as defined by the claims set forth below.

What is claimed is:

1. A power steering system for use on a vehicle having at least one steerable wheel movable to either side of a center position in response to a steering force transmitted through a steering shaft connected to a steering member operable by a driver of the vehicle, said system comprising:

a power unit having a power piston confined in a power cylinder having respective left and right end walls defining a left turn chamber and a right turn chamber each pressurizable by a fluid, said power piston being arranged for reciprocal movement in said cylinder to drive a linkage for moving said steerable wheel to either side of said selected position;

a sleeve member having an axial bore and arranged for rotation around an axis of said bore, said sleeve member being connected to said piston such that rotation of said sleeve member in one rotary direction causes linear movement of said piston in one linear direction, and rotation of said sleeve member in another rotary direction causes linear movement of said piston in another linear direction; and a rotary valve member received in said axial bore for rotary movement relative to said sleeve member and having a plurality of grooves and lands cooperating with a plurality of ports in said sleeve member to define a first spool valve and a second spool valve, one portion of said rotary valve member being connected to said sleeve member through a torsion rod and another portion of said rotary valve member being connected to said steering shaft such that said torsion rod tends to maintain said rotary valve member in a neutral position relative to said sleeve member when twisting of said torsion rod is caused by rotation of said rotary valve member relative to said sleeve member to either side of said neutral position;

wherein said first spool valve includes an inlet port for receiving said fluid from a fluid source, a recycle port for recycling said fluid to said fluid source, and an outlet port for supplying said fluid to a supply conduit;

wherein the grooves and lands of said first spool valve are arranged to by-pass said fluid to said recycle port when said rotary valve member is in its neutral position, and to close said recycle port and discharge said fluid to said supply conduit through said outlet port when said rotary valve member rotates relative to said sleeve member to either side of said neutral position;

wherein said second spool valve includes a supply port for receiving said fluid from said supply conduit, a left port in fluid communication with said left turn chamber, and a right port in fluid communication with said right turn chamber; and wherein the grooves and lands of said second spool valve are arranged to close said left and right ports when said rotary valve member is in its neutral position, to supply said fluid from said left port to said left turn chamber when said rotary valve member rotates relative to said sleeve member to one side of said neutral position, and to supply said fluid from said right port to said right turn chamber when said rotary valve member rotates relative to said sleeve member to the other side of said neutral position.

2. A power steering system according to claim 1, wherein said second spool valve further includes a return port in fluid communication with a reservoir of said fluid source, and wherein the grooves and lands of said second spool valve are arranged to connect said left port to said return port when said right port is supplying fluid to said right turn chamber, and to connect said right port to said return port when said left port is supplying fluid to said left turn chamber.

3. A power steering system according to claim 1, wherein said left port is connected to said left turn chamber via a left conduit containing a left check valve, wherein said right port is connected to said right turn chamber via a right conduit containing a right check valve, wherein said left conduit is connected to a reservoir of said fluid source via a left return line containing a left solenoid valve, wherein said right conduit is connected to said reservoir via a right return line containing a right solenoid valve, and wherein said power steering system further comprises a right electrical switch for actuating said right solenoid to open said right return conduit in response to rotation of said steering shaft toward a left turn position and a left electrical switch for actuating said left solenoid to open said left return conduit in response to rotation of said steering shaft toward a right turn position.

4. A power steering system according to claim 3, wherein said first electrical switch is carried by said sleeve member so as to be operated when said rotary valve member rotates relative to said sleeve member to one side of said neutral position, and said second electrical switch is carried by said sleeve member so as to be operated when said rotary valve member rotates relative to said sleeve member to the other side of said neutral position.

5. A power steering system according to claim 1, further comprising a centering unit arranged to engage said steering shaft to provide a return force continuously biasing said steering shaft toward a selected position upon rotation of said steering shaft to either side of said selected position in response to movement of said steerable wheel to either side of its center position, the center position of said steerable wheel corresponding to the selected rotational position of said steering shaft.

6. A power steering system according to claim 5, wherein said return force resists movement of said steerable member away from its center position as determined by said selected position of the steering shaft.

7. A power steering system according to claim 5, wherein said left port is connected to said left turn chamber via a left conduit containing a left check valve, wherein said right port is connected to said right turn chamber via a right conduit containing a right check valve, wherein said left conduit is connected to a reservoir of said fluid source via a left return line containing a left solenoid valve, wherein said right conduit is connected to said reservoir via a right return line containing a right solenoid valve, and wherein said power steering system further comprises a right electrical switch for actuating said right solenoid to open said left return conduit in response to rotation of said steering shaft toward a right turn position and a left electrical switch for actuating said left solenoid to open said left return conduit in response to rotation of said steering shaft toward a right turn position.

8. A power steering system according to claim 7, wherein said first electrical switch is carried by said sleeve member so as to be operated when said rotary valve member rotates relative to said sleeve member to one side of said neutral position, and said second electrical switch is carried by said sleeve member so as to be operated when said rotary valve member rotates relative to said sleeve member to the other side of said neutral position.

9. A power steering system according to claim 5, wherein said centering unit comprises:

a worm member having a spiral thread and fixed between an input shaft connected to said steering shaft and an output shaft connected to said steerable wheel, said worm member being rotatable with said input and output shafts and the rotational position of said worm member defining said selected position;

a centering cylinder providing first and second centering chambers;

a first piston arranged for reciprocating movement in said first centering chamber, and a second piston arranged for reciprocating movement in said second centering chamber, each of said first and second pistons being arranged to move independently of the other between a retracted position and a compressive position for compressing a resilient means within its corresponding chamber, said resilient means when compressed applying a resilient force opposing compressive movement of the corresponding piston; and, thread engaging means for transmitting said resilient force from said first and second pistons to said worm member, said thread engaging means comprising a reciprocating member arranged for movement to either side of a neutral position corresponding to said selected position, and a worm follower member for causing said reciprocating member to engage each of said pistons independently of the other, said follower member engaging said spiral thread so that rotation of said worm member in one direction causes said reciprocating member to move to one side of said neutral position and produce compressive movement of said first piston without moving said second piston and rotation of said worm member in the other direction causes said reciprocating member to move to the other side of said neutral position and produce compressive movement of said second piston without moving said first piston, said transmission of said resilient force to said worm member causing said output shaft to provide a resistance force resisting steering forces tending to move said steerable member to either side of its center position.

10. A power steering system according to claim 9, wherein said centering unit further comprises trim means for varying the center position of said steerable member by changing the neutral position of said reciprocating member relative to a corresponding neutral position of said worm member, said trim means comprising drive means for causing trimming movement of said reciprocating member in response to at least one remote input so as to rotate said reciprocating member relative to said worm member, and control means for selectively providing said at least one remote input to said drive means from a location remote to said reciprocating member such as a driver's station of said vehicle.

11. A power steering system according to claim 9, wherein said resilient means comprises pneumatic means for providing a pressurized gas in said first and second centering chambers.

12. A power steering system according to claim 9 further comprising control means for changing the amount of said resilient force by varying from a location remote from said centering cylinder an amount by which said resilient means presses against said first and second pistons.

13. A power steering system according to claim 9, wherein said resilient means comprises fluid means for providing a pressurized fluid in each of said first and second centering chambers so that fluid pressure provides said resistance force by opposing movement of said steerable member toward either side of said center position and provides a return force continuously biasing said steerable member toward said center position during movement of said steerable member to either side of said center position, said fluid pressure causing said pistons to bias said reciprocating member toward said neutral position during a compressive movement of each of said pistons in its corresponding centering chamber.

14. A power steering system according to claim 9, wherein said left port is connected to said left turn chamber via a left conduit containing a left check valve, wherein said right port is connected to said right turn chamber via a right conduit containing a right check valve, wherein said left conduit is connected to a reservoir of said fluid source via a left return line containing a left solenoid valve, wherein said right conduit is connected to said reservoir via a right return line containing a right solenoid valve, and wherein said power steering system further comprises a right electrical switch for actuating said right solenoid to open said right return conduit in response to rotation of said steering shaft toward a left turn position and a left electrical switch for actuating said left solenoid to open said left return conduit in response to rotation of said steering shaft toward a right turn position.

15. A power steering system according to claim 14, wherein said first electrical switch is carried by said sleeve member so as to be operated when said rotary valve member rotates relative to said sleeve member to one side of said neutral position, and said second electrical switch is carried by said sleeve member so as to be operated when said rotary valve member rotates relative to said sleeve member to the other side of said neutral position.

\* \* \* \* \*